UNITED STATES PATENT OFFICE.

GEORG KALISCHER, OF FRANKFORT-ON-THE-MAIN, GERMANY, ASSIGNOR TO CASSELLA COLOR COMPANY, OF NEW YORK, N. Y.

RED AZO DYE AND PROCESS OF MAKING SAME.

No. 813,155. Specification of Letters Patent. Patented Feb. 20, 1906.

Application filed August 21, 1905. Serial No. 275,169.

*To all whom it may concern:*

Be it known that I, GEORG KALISCHER, doctor of philosophy, a citizen of Prussia, and a resident of Frankfort-on-the-Main, in the Province of Hesse-Nassau and Kingdom of Prussia, Germany, have invented certain new and useful Improvements in Red Azo Dyes and Processes of Making Same, of which the following is a specification.

My invention consists in combining in alkaline solution one molecule of an aromatic diazo compound with one molecule of the .5.oxynaphtho diamidobenzaldehydin.7.sulfo-acid obtained by condensing in aqueous solution one molecule of 1.2 diamidonaphthalene.5.oxy.7.sulfo-acid with two molecules of m-amidobenzaldehyde, (or m-nitrobenzaldehyde and subsequent reduction.) The azo dyes thus obtained dye unmordanted cotton to shades varying from yellowish-red to bluish-red. Such dyeings, though possessing a good resistance to acids, are not fast to washing. On account of the presence of primary amido groups in the molecule, these dyestuffs may be diazotized and developed on the fiber. Contrary to usual experience with direct dyeing cotton azo colors, these developed dyeings do not change to a deeper shade of blue or to black, but turn a brighter red. The fastness to washing thereby becomes excellent.

The method of production is illustrated by the following example: 10.7 kilos o-toluidin are transformed into the diazo compound, which is introduced into the solution of forty-six kilos 5.oxynaphtho diamidobenzaldehydin.7.sulfo-acid in the presence of an excess of soda. The coloring-matter separates at once. It is easily soluble in water with a red color and dyes unmordanted cotton direct a bluish-red shade. By diazotizing on the fiber and developing with beta-naphthol a bright scarlet is obtained. The dyestuff dissolves in concentrated sulfuric acid with a bluish-red color.

Having now described my invention and the manner in which it may be carried out, what I claim is—

1. The process of preparing red azo dyes by combining in alkaline solution one molecule of an aromatic diazo compound with one molecule of the 5.oxynaphtho diamidobenzaldehydin.7.sulfo-acid.

2. The coloring-matters obtained by combining in alkaline solution one molecule of an aromatic diazo compound with one molecule of the 5.oxynaphtho diamidobenzaldehydin.7.sulfo-acid, the said coloring-matters being in the dry state red powders of a metallic luster, soluble in water with a yellowish-red to bluish-red color, dissolving in concentrated sulfuric acid with a bluish-red color, substantially as described.

Signed at Frankfort-on-the-Main, in the Province of Hesse-Nassau, Kingdom of Prussia, this 31st day of July, A. D. 1905.

GEORG KALISCHER.

Witnesses:
  JEAN GRUND,
  CARL GRUND.